United States Patent [19]

Burdick et al.

[11] Patent Number: 5,645,731

[45] Date of Patent: Jul. 8, 1997

[54] AQUEOUS SUSPENSIONS OF POLY (ETHYLENE OXIDE) USEFUL AS A FLOCCULENT

[75] Inventors: Charles Lee Burdick, Landenberg, Pa.; Elliott Echt, Wilmington, Del.

[73] Assignee: Hercules Incorporated, Wilmington, Del.

[21] Appl. No.: 704,027

[22] Filed: Aug. 26, 1996

Related U.S. Application Data

[62] Division of Ser. No. 471,936, Jun. 6, 1995, Pat. No. 5,578,168, which is a division of Ser. No. 55,653, Apr. 30, 1993, abandoned.

[51] Int. Cl.$^6$ .................................................. B03D 3/06
[52] U.S. Cl. ........................ 210/728; 210/727; 210/725
[58] Field of Search ................................ 210/723, 725, 210/727, 728, 731, 928, 729; 162/164.3, 163, 183, 168.1

[56] References Cited

U.S. PATENT DOCUMENTS

| | | | |
|---|---|---|---|
| 4,070,236 | 1/1978 | Carrard et al. | 162/164.5 |
| 5,228,908 | 7/1993 | Burdick et al. | 106/194 |
| 5,342,538 | 8/1994 | Chung et al. | 252/180 |

OTHER PUBLICATIONS

Tay, C. H. "Application of polymeric flocculant in newsprint stock systems for fines retention improvement", TAPPI J., vol. 63, No. 11, pp. 89–92 1984.

*Primary Examiner*—Donald E. Czaja
*Assistant Examiner*—Jose A. Fortuna
*Attorney, Agent, or Firm*—David Edwards

[57] ABSTRACT

A method is provided for using an aqueous suspension of at least 15% of poly(ethylene oxide)(PEO) as a flocculent. PEO is dispersed in an aqueous solution of at least one salt selected from the group consisting of sodium or potassium formate, sodium or potassium hydroxide, sodium or potassium citrate, sodium or potassium acetate, sodium chloride or mixtures thereof to form a poly(ethylene oxide) suspension having at least 15% of poly(ethylene oxide) by total weigh. This suspension is dissolved in an aqueous system; and said dissolved aqueous system is added in conjunction with a solution of a coagulant or synthetic flocculents selected from the group consisting of alum, polyaluminum chloride, sodium aluminates, polyamines, polyacrylamides, copolymers of acrylamide with cationic or anionic monomers, or polyethylene imine, to an aqueous slurry containing finely divided materials, whereby said dissolved aqueous dispersion enhances the separation of the finely divided materials from the liquid in the aqueous slurry.

5 Claims, No Drawings

AQUEOUS SUSPENSIONS OF POLY (ETHYLENE OXIDE) USEFUL AS A FLOCCULENT

This application is a division, of application Ser. No. 08/471,936, filed Jun. 6, 1995 now U.S. Pat. No. 5,578,168, which is a division of application Ser. No. 08/055,653, filed Apr. 30, 1993 now abandoned

BACKGROUND OF THE INVENTION

This invention relates to stable fluid suspensions of poly (ethylene oxide) in aqueous carrier systems.

Prior to the present invention, poly(ethylene oxide) (PEO) has traditionally been handled in its dry, particulate form. Problems associated with dry PEO include undesirable dust generation, poor dispersibility when added to aqueous systems, and undesirably long dissolution times. The dust associated with dry, particulate PEO presents the same conventional handling problems as are encountered with other finely divided particulate materials.

Poly(ethylene oxide) (PEO) has been used as a retention aid in manufacture of paper either alone, or along with certain phenolic resins, as described in U.S. Pat. Nos. 4,070,236 and 4,313,790. An impediment to using PEO in these applications has been creating a stable solution of the PEO in water, either due to difficulties in dissolving the dry PEO or because of certain contaminants such as free chlorine or ferric ion in the water, as described in Canadian patent 1,137,261. U.S. Pat. Nos. 3,843,589 and 3,736,288 describe some of the disadvantages of solutions made from the dry polymer and suspensions using organic liquids that are non-solvents for the PEO.

SUMMARY OF THE INVENTION

The present invention provides fluidized polymer suspensions (FPS) of PEO that provide ease and convenience of handling without introducing organic solvents into the process. Solutions made from these suspensions are effective when used as retention aids in paper manufacture. In addition, stability towards ferric ion or free chlorine in the dilution water is provided.

The present invention is directed to an aqueous suspension of PEO comprising at least 20% by total weight of the suspension, of PEO dispersed in an aqueous solution of at least one salt selected from sodium or potassium formate, sodium or potassium hydroxide, sodium or potassium acetate, sodium or potassium citrate, sodium chloride and dibasic potassium phosphate.

This invention also comprehends a method of using the above mentioned PEO fluid suspensions as retention aids and as a stabilizer against ferric ions or free chlorine in solution water in a paper manufacturing operation.

DETAILED DESCRIPTION OF THE INVENTION

It has been found that aqueous fluid suspensions of 20% by weight or greater of PEO can be prepared by dispersing the PEO in water that contains appropriate concentrations of selected salts without causing the PEO to thicken to a paste consistency. These fluidized polymer suspensions of PEO dissolve significantly faster, when added to dilution water, as compared to dry PEO.

The PEO used in this invention has a molecular weight of at least 50,000 Daltons and, preferably, greater than about 3 million Daltons. The molecular weight of 4–7 million Daltons is especially needed for use as a retention agent in the paper and paper products industries.

Poly(ethylene oxide) can also be used in a number of other different industrial practices. For some of these uses the highest molecular weight is desired. In the case of poly(ethylene oxide)'s use as a flocculent for water clarification, a molecular weight of greater than 5 million Daltons is most dosage-effective. Other applications such as personal care creams and lotions, where a smooth rheology is desired, use the lower molecular weight products of less than 1 million Daltons. In a beer additive application in which PEO is employed to enhance foam head stability, an even lower molecular weight may be desired. Finally, in the use of PEO for emulsion polymerization, a very low molecular weight of 100,000 Daltons or less is probably most effective to avoid latex coagulation during the polymerization reaction.

Significant use properties of PEO are complete water solubility, low toxicity, unique solution rheology, complexation with organic acids, low ash content, and thermoplasticity. These properties make PEO especially desirable in association complexes; the high molecular weight PEO forms association complexes with a wide variety of materials: Phenolic resins, resole resins, polyureas, urea, thioureas, gelatin, lignin derivatives, tannic acid, mercury salts, and polymeric acids. Another use of PEO is as flocculation agents; examples of other coagulants or synthetic flocculents that the dissolved suspension of the present invention can be used in conjunction with are alum, polyaluminum chloride, sodium aluminates, ployamines, polyamide epihalohydrin resins, polyacrylamides, copolymers of acrylamide with cationic or anionic monomers, or polyethylene imine. In the cases where the polymer-bridging mechanism controls the flocculation rate, the high molecular weight grades of PEO excel. PEO has been successfully used in many cases to flocculate dispersed and soluble silica, clay and coal in the mining industry. For the flocculation of these mineral fines, a solution of PEO is added to the aqueous slurry of the fines which causes the fines to agglomerate. The agglomerated particles are then separated from the water either by gravimetric settling, filtration, or centrifugation, etc. In the pulp and paper industry, it is used, e.g., to prevent the loss of fiber fines and for filler retention, being added to the pulp slurry just prior to wet web formation of the paper.

PEO can also be used in adhesives because solutions of PEO with concentrations as low as 1–5 weight percent are very tacky and stringy; on drying, this adhesive property vanishes until the polymer is rewetted and, thus, is useful for temporary binding or fastening. The low toxicity and gel-forming properties are ideally mated to produce a thick, cushioning fluid between the dentures and gums as a denture adhesive. PEO resists acid degradation (which is common to natural and cellulosic polymers) and can be used commercially in acid cleaners for ceramic, glass, and metal surfaces. PEO has the ability to reduce spatter and mist formation in aqueous formulations based on its pseudoplastic rheology, and thus is useful in water-based cutting lubricants, paints and herbicides for drift control. The pseudoplastic properties of aqueous solutions of PEO add the dimension of fluid-loss control at the oil well-wall interface. This is particularly important when drilling in high permeability strata, in which case the strata can be invaded by drilling fluid or foam. PEO can also be used as a mineral-process handling aid because PEO helps in pumping of concrete additives based on PEO mixes with low water content. There are many other uses of PEO, too many to mention, because of its unique properties (Kirk-Othmer Encyclopedia of Chemical Technology, 3rd edition, 1982, John Wiley and Sons, New York, Vol. 18, pp. 627–632).

The advantages of the invention are: 1) an easy to handle suspension of poly(ethylene oxide) without organic solvents, and in some cases 2) a solution of PEO made from the suspension of the instant invention resists viscosity loss due to ferric ion or free chlorine in the water.

A number of salts are useful to prepare aqueous suspensions of PEO. These include sodium or potassium formate, potassium or sodium citrate, sodium or potassium acetate, sodium chloride, dibasic potassium phosphate, sodium or potassium hydroxide or mixtures thereof. Sodium formate is the preferred salt. The salts of this invention should be present in the suspension in the amount of from about 10% to about 40% (preferably, 15 to about 25%) by weight, based on the total weight of the suspension. The ratio of salt to water in the suspension is from about 1:1 to 1:7.

Fluid suspensions of this invention contain from about 15% to about 35% of PEO, preferably from about 20% to about 30% by weight, based on the total weight of the suspension.

A number of other additives can be present in the present invention to provide beneficial properties to the suspension. Stabilizers such as xanthan gum or sodium carboxymethylcellulose are preferred additives. These stabilizers increase the time over which the suspension will remain stable. Stabilizers in the instant invention are typically present in the amount of up to 1.5% by weight of the suspension and are preferably used in an amount of 0.05% to 0.25%.

Other additives that can be used include preservatives, such as Proxel® GXL solution (marketed by ICI), in an amount of up to 0.3%, preferably about 0.1%. Dispersants, surfactants, glycols, pigments, and thickening agents can also be incorporated into the PEO suspension of this invention when needed for a particular application. These can be generally used in amounts up to 10% by weight of the total suspension.

In a preferred embodiment of the invention, a suspension of 20–25% by weight of PEO was prepared by adding the dry polymer to an aqueous solution of concentrated sodium formate to form a fluid pourable suspension. A PEO solution prepared from this can give useful performance properties as a retention aid in a paper manufacturing operation.

The PEO suspensions of this invention, thus, can be prepared by dissolving the salt in water to form an aqueous salt solution and, then, dispersing with agitation the PEO therein. In the case where other additives are used, these additives are typically added to the water before the salt. In some instances, heat may be needed to readily effect the dissolution of certain salts.

The suspensions of this invention have a long shelf life (no separation or stratification) and can readily be added to aqueous systems by simply adding (e.g., pouring) the suspension into the aqueous system with agitation. The manner in which this suspension is used in the industry is limited only by the limitation placed on aqueous suspensions.

This invention will be further illustrated by the following examples.

EXAMPLE I

Preparation of Suspensions of PEO

Suspensions of PEO for the instant invention were made by the following process:

1. A measured quantity of water is added to a mixing vessel and agitated.
2. A measured amount of xanthan gum (marketed by Kelco Industries) is added to the water with stirring continued until the xanthan is dissolved.
3. A salt (or salts) as described below is added and stirred to effect dissolution.
4. After complete dissolution of the salt, dry powdered poly(ethylene oxide) is added to the xanthan and salt solution and stirred to disperse.
5. As an optional ingredient, Proxel® GXL preservative is added to those suspensions where long term storage is desired.

The suspensions of Polyox® 301 or Polyox 303® polymers (marketed by Union Carbide Corp.) used in the examples of Tables I, IA, IB, and IC had the following compositions (Tables I, IA, and IB show compositions that worked while Table IC show comparative samples that did not work):

TABLE I

| PEO Suspension Sample | Parts Water | Salt Type | Parts Salt | % PEO & Type | Parts Xanthan | Parts Proxel GXL |
|---|---|---|---|---|---|---|
| A | 47.25 | Sodium Formate | 20 | 30 301 | 0.15 | 0.1 |
|   |       | Dibasic Potassium Phosphate | 2.5 |   |   |   |
| B | 47.25 | Sodium Formate | 20 | 30 301 | 0.15 | 0.1 |
|   |       | Sodium Sulfate | 2.5 |   |   |   |
| C | 49.75 | Sodium Formate | 20 | 30 301 | 0.15 | 0.1 |
| D | 39.75 | Potassium Citrate | 40 | 20 301 | 0.15 | 0.1 |
| E | 59.75 | Sodium Formate | 20 | 20 303 | 0.15 | 0.1 |
| F | 59.75 | Sodium Formate | 20 | 20 301 | 0.15 | 0.1 |
| G | 59.85 | Sodium Acetate | 20 | 20 301 | 0.15 | — |
| H | 59.6 | Sodium Chloride | 20 | 20 301 | 0.3 | 0.1 |
| I | 59.85 | Sodium Hydroxide | 20 | 20 301 | 0.15 | — |
| J | 39.85 | Potassium Acetate | 40 | 20 301 | 0.15 | — |
| K | 39.85 | Potassium Citrate | 40 | 20 301 | 0.15 | — |

TABLE IA

SALTS FOR PREPARING FLUID POLYMER SUSPENSIONS OF POLY(ETHYLENE OXIDE)

| Ingredients* Test | Water % | Salt Type | Salt % | Polyox 301 % | Suspension Appearance |
|---|---|---|---|---|---|
| 1 | 59.85 | Na Formate | 20 | 20 | Fluid, Stable |
| 2 | 59.85 | (NH$_4$)$_2$HPO$_4$ | 20 | 20 | Thick, unstable (separates) |
| 3 | 49.85 | (NH$_4$)$_2$HPO$_4$ | 30 | 20 | Very fluid, unstable (separates) |
| 4 | 59.85 | (NH$_4$)$_2$SO$_4$ | 20 | 20 | Thick, unstable (separates) |
| 5 | 49.85 | (NH$_4$)$_2$SO$_4$ | 30 | 20 | Very fluid, unstable |

TABLE IA-continued

SALTS FOR PREPARING FLUID POLYMER SUSPENSIONS OF POLY(ETHYLENE OXIDE)

| Ingredients* Test | Water % | Salt Type | Salt % | Polyox 301 % | Suspension Appearance |
|---|---|---|---|---|---|
| 6 | 59.85 | Na Citrate | 20 | 20 | Gel |
| 7 | 39.85 | Na Citrate | 40 | 20 | Fluid, stable |
| 8 | 59.85 | Na acetate | 20 | 20 | Fluid, stable |
| 9 | 59.85 | NaCl | 20 | 20 | Fluid, stable |
| 10 | 59.85 | NaOH | 20 | 20 | Fluid, stable |
| 11 | 59.85 | KOH | 20 | 20 | Fluid, stable |
| 12 | 59.85 | NH$_4$OH | 20 | 20 | Gel |
| 13 | 50.00 | NH$_4$OH | 30 | 20 | Fluid |
| 14 | 59.85 | Potassium acetate | 20 | 20 | Gel |
| 15 | 39.85 | Potassium acetate | 40 | 20 | Fluid, stable |
| 16 | 39.85 | Potassium citrate | 40 | 20 | Fluid, stable |
| 17 | 59.85 | K$_2$CO$_3$ | 20 | 20 | Thick, barely flows |

*0.15% xanthan gum in all tests except test 13.

TABLE IB

Preferred Effective Salts for Preparing Fluid Polymer Suspensions of Poly(ethylene oxide)

| Ingredients* Test | Water % | Salt Type | Salt % | Polyox 301 % | Suspension Appearance |
|---|---|---|---|---|---|
| 1 | 59.85 | Na Formate | 20 | 20 | Fluid, Stable |
| 2 | 64.85 | Na Formate | 15 | 20 | Thick, barely flows |
| 3 | 59.85 | Na Acetate | 20 | 20 | Fluid, stable |
| 4 | 64.85 | Na Acetate | 15 | 20 | Thick, unstable (separates) |
| 5 | 59.85 | NaCl | 20 | 20 | Fluid, stable |
| 6 | 64.85 | NaCl | 15 | 20 | Gel |
| 7 | 59.85 | NaOH | 20 | 20 | Fluid, stable |
| 8 | 64.85 | NaOH | 15 | 20 | Fluid, stable |
| 9 | 69.85 | NaOH | 10 | 20 | Thick, barely flows |
| 10 | 59.85 | KOH | 20 | 20 | Fluid |
| 11 | 64.85 | KOH | 15 | 20 | Thick, barely flows |

*0.15% xanthan used in all tests.

TABLE IC

SALTS INEFFECTIVE FOR PREPARING PEO FPS

| Ingredients* Test | Water % | Salt Type | Salt % | Polyox 301 % | Suspension Appearance |
|---|---|---|---|---|---|
| 1 | 59.85 | KCl | 20 | 20 | Gel |
| 2 | 51.85 | KCl | 28 | 20 | Gel |
| 3 | 59.85 | NH$_4$Cl | 20 | 20 | Gel |
| 4 | 49.85 | NH$_4$Cl | 30 | 20 | Gel |
| 5 | 59.85 | Na nitrate | 20 | 20 | Gel |
| 6 | 39.85 | Na nitrate | 40 | 20 | Gel |
| 7 | 39.85 | CaCl$_2$ | 40 | 20 | Gel |
| 8 | 49.85 | MgCl$_2$ | 30 | 20 | Gel |
| 9 | 39.85 | MgCl$_2$ | 40 | 20 | Paste |
| 10 | 49.85 | epsom salt | 30 | 20 | Gel |
| 11 | 39.85 | epsom salt | 40 | 20 | Gel |
| 12 | 59.85 | NaH CO$_3$ | 20 | 20 | Paste |
| 13 | 59.85 | Na$_2$CO$_3$ | 20 | 20 | Paste |
| 14 | 59.85 | Na benzoate | 20 | 20 | Gel |
| 15 | 49.85 | Na benzoate | 30 | 20 | Gel |
| 16 | 59.85 | Na sulfite | 20 | 20 | Thick, does not flow |
| 17 | 59.85 | Na metabisulfite | 20 | 20 | Paste |
| 18 | 59.85 | Na Bisulfite | 20 | 20 | Paste |
| 19 | 59.85 | Ca acetate | 20 | 20 | Gel |
| 20 | 39.85 | Ca formate | 40 | 20 | Gel |
| 21 | 59.85 | Na thiosulfate | 20 | 20 | Gel |
| 22 | 59.85 | Alum | 20 | 20 | Gel |
| 23 | 59.85 | Blancol N*** | 20 | 20 | Gel |
| 24 | 59.85 | Na poly-acrylate**** | 20 | 20 | Gel |
| 25 | 39.85 | Na lignin sulfonate***** | 40 | 20 | Gel |
| 26** | 60.00 | Carboxy-methyl-cellulose****** | 20 | 20 | Gel |

*0.15% xanthan gum in all tests except as noted.
**no xanthan employed.
***condensed napthalene sulfonate
****Dispex N-40, active
*****Lignosol XD
******Ambergum® 3021, active solids

EXAMPLE II

Use of PEO from Suspensions as Retention Aids in Paper Manufacture

A drainage jar, similar to those used in the paper industry to measure retention, referred to as the Portable Dynamic Drainage Tester, was used to measure fines retention for evaluation of the PEO suspensions.

The procedure for the Portable Dynamic Drainage Tester (PDDT) is to measure about 200 g of a stock sample at headbox consistency into a 1000 ml plastic graduated cylinder. This sample is then inverted six times, then any additive is added to the cylinder and an additional six inversions of the cylinder is made before pouring the sample into the top of the PDDT. If more than one additive is used, the sample is inverted six times between additives, with an additional six inversions between the last additive and pouring the sample into the PDDT.

The PDDT agitator is operated at 750 rpm with the bottom valve open at the time of sample addition. The bottom of the PDDT is a perforated stainless steel plate which allows water containing solids to drain through the plate and to be collected below the PDDT. When 100 ml. of this "white water" is collected, the bottom valve is closed and the solids of the white water are determined. This white water solids are compared to total solids for first pass retention and to fines content for fine particle retention. Fine particle retention is a more sensitive test.

The fines content is defined as the dry weight of material per 100 ml. of white water that passes through the screen of the PDDT when the stirrer at 750 rpm is held against the screen during an experimental run with no polymers added.

A variety of suspensions were compared to dry PEO for use as a retention aid in a simulated newsprint furnish. The results from the runs using the PEO made from the dry Polyox® 301 polymer are compared to each PEO suspension.

Various suspensions of the instant invention using Polyox 301 or 303 PEO in water were added to distilled water to give 0.5% poly(ethylene oxide) by weight. Similar solutions were made directly from dry Polyox 301 and dry Polyox 303 materials. Fines retention was measured as described above on a paper slurry of a total solids of 0.76%, comprising 25% kraft pulp, 25% groundwood pulp, and 50% TMP (thermo-mechanical pulp) and compared to retention with a 0.5% solids solution made from dry Polyox 301 PEO or dry Polyox 303 PEO. The solutions were diluted to 0.025% PEO solids before addition to the paper slurry to facilitate mixing. Fines retention with no PEO added was 16.0%. The results of these tests using dry PEO as a control are set forth in Table II below.

TABLE II

| Experiment* | PEO lbs./ton | % Fines Retention |
| --- | --- | --- |
| I | 0.33 | 15.3 |
| Dry Polyox 301 | 0.64 | 14.5 |
| (control) | 0.95 | 13.6 |
| II | 0.32 | 15.9 |
| Dry Polyox 303 | 0.64 | 16.6 |
| (control) | 0.93 | 14.3 |
| III | 0.31 | 11.9 |
| Suspension A | 0.60 | 11.8 |
|  | 0.94 | 14.7 |
| IV | 0.32 | 17.3 |
| Suspension B | 0.65 | 14.9 |
|  | 0.91 | 16.1 |
| V | 0.34 | 17.5 |
| Suspension C | 0.67 | 17.9 |
|  | 0.98 | 15.4 |
| VI | 0.32 | 16.5 |
| Suspension D | 0.62 | 18.5 |
|  | 0.90 | 16.5 |
| VII | 0.31 | 13.9 |
| Suspension E | 0.63 | 15.7 |
|  | 0.96 | 14.2 |
| VIII | 0.33 | 17.8 |
| Suspension F | 0.66 | 17.1 |
|  | 0.93 | 15.8 |

*Suspensions used were the corresponding samples from Table I.

EXAMPLE III

Use of PEO From Suspensions as Retention Aids in Combination with Phenolic Resin The same paper slurry sample and PEO solutions described in Example II were above used. To form a complex with the PEO to improve retention, phenol-formaldehyde resin (Neste Resins, Canada, Type BB-139), at three times the dosage of PEO, was added to the 1000 ml. cylinder, then the cylinder was inverted six times before the PEO solution was added. Fines retention was determined as described above. Results are compared to the same procedure done with a Polyox 301 or Polyox 303 solution made from the dry powder. Fines retention results of the tests are set forth in in Table III below.

TABLE III

| Experiment* & PEO Source | PEO lbs./ton | % Fines Retention |
| --- | --- | --- |
| I | 0.32 | 52.2 |
| Dry Polyox 301 | 0.63 | 73.0 |
|  | 1.0 | 86.2 |
| II | 0.32 | 62.1 |
| Dry Polyox 303 | 0.59 | 81.4 |
|  | 0.97 | 96.2 |

TABLE III-continued

| Experiment* & PEO Source | PEO lbs./ton | % Fines Retention |
| --- | --- | --- |
| III | 0.33 | 51.1 |
| Suspension A | 0.65 | 76.9 |
|  | 0.93 | 85.8 |
| IV | 0.31 | 46.0 |
| Suspension B | 0.61 | 79.6 |
|  | 0.94 | 89.7 |
| V | 0.32 | 54.3 |
| Suspension C | 0.65 | 83.2 |
|  | 0.91 | 86.8 |
| VI | 0.33 | 55.0 |
| Suspension D | 0.61 | 80.0 |
|  | 0.99 | 91.3 |
| VII | 0.34 | 67.4 |
| Suspension E | 0.65 | 95.7 |
|  | 0.96 | 97.4 |
| VIII | 0.33 | 60.2 |
| Suspension F | 0.64 | 82.4 |
|  | 0.90 | 90.3 |

*Suspensions used were the corresponding samples from Table I.

EXAMPLE IV

Stability of PEO Solutions to Ferric Ion

Distilled water was vigorously sparged with nitrogen for 15 minutes, after which time 160 mg/liter ferric chloride (ferric chloride, anhydrous, EM Science Division of EM Industries, Inc., Cherry Hill, N.J.), was added while nitrogen sparging continued. This resulted in a clear pale green solution of ferric chloride. Dry PEO or PEO from suspension in amounts to make a 0.5% PEO solution was dissolved in this water immediately after the nitrogen sparging was discontinued. Viscosity and appearance were observed for 24 hours. Viscosity was measured on a Brookfield LVT viscometer, #1 spindle at 60 rpm. The results are set forth below in Table IV.

TABLE IV

PEO Solutions in 160 ppm Ferric Chloride

| Time (hours) | A* In FeCl$_3$ (cps) | B* In FeCl$_3$ (cps) | C* In FeCl$_3$ (cps) | D* In FeCl$_3$ (cps) | Dry Polyox 301 In FeCl$_3$ (cps) | Dry Polyox 301 In Distilled Water (cps) |
| --- | --- | --- | --- | --- | --- | --- |
| 0 | 78 | 51 | 68 | 29 | 10 | 64 |
| 1 | 81 | 53 | 73 | 22 |  |  |
| 2 |  |  |  |  | 9 | 65 |
| 3 | 81 | 55 | 75 | 16 |  |  |
| 4 |  |  |  |  |  |  |
| 5 | 80 | 53 | 74 | 14 |  |  |
| 7 | 80 | 52 | 76 | 12 |  |  |
| 19 |  |  |  |  | 7 | 69 |
| 24 | 84 | 53 | 80 | 11 |  |  |

*Suspensions used were the corresponding samples from Table I.

The appearance of the solution made from Suspension A in the ferric chloride solution was pale yellow; from Suspensions B and C and the dry Polyox 301 PEO, the solution was brown. The solution from Suspension D remained pale green. Solutions of 0.5% PEO made from the Suspensions A, B, and C in distilled water generally give the same viscosity as in ferric chloride –68, 64, and 80 cps. respectively for A, B, and C. The viscosity of a solution from Suspension D was 80 cps.

EXAMPLE V

Household bleach, 5.25% sodium hypochlorite, was used to make a 5 ppm sodium hypochlorite solution in distilled water. A colorimetric test (LaMotte Chemical Products Co., Chestertown, Md.) showed between 3 and 4 ppm free chlorine in the solution. PEO from suspensions and dry PEO were used to make 0.5% PEO solutions in the dilute bleach.

The results in Table V indicate a substantial advantage for the PEO solutions made from the fluidized polymer suspensions. The viscosity of the dry PEO in distilled water (no bleach) is about 65–70 cps at 0.5% PEO.

TABLE V

Viscosity** of 0.5% PEO Solutions
In 5 ppm Sodium Hypochlorite

| Time (hours) | A*** (cps) | B*** (cps) | C*** (cps) | D*** (cps) | Dry PEO* (cps) |
|---|---|---|---|---|---|
| Initial | 79.2 | 74.2 | 63.5 | 64.7 | |
| 1 | 83.9 | 78.6 | 71.0 | 67.5 | 28.6 |
| 2 | 85.0 | 78.9 | 73.2 | 67.1 | 28.6 |
| 4 | 85.4 | 79.1 | 75.3 | 67.1 | 27.1 |
| 6 | 84.1 | 78.2 | 74.0 | 66.3 | 28.0 |
| 24 | 84.4 | 79.4 | 75.0 | 66.6 | 25.5 |

| Time (hours) | G*** (cps) | H*** (cps) | I*** (cps) | J*** (cps) | K*** (cps) |
|---|---|---|---|---|---|
| Initial | 85.5 | 88.0 | 77.5 | 66.4 | 79.5 |
| 1 | 83.5 | 86.0 | 77.6 | 67.8 | 77.8 |
| 3 | 81.5 | 81.2 | 77.4 | 61 | 75.6 |
| 5 | 80.1 | 78.2 | 77.0 | 57.4 | 73.5 |
| 7 | 81.9 | 79.5 | 78.4 | 58 | 74.1 |
| 94 | 74.4 | 76.4 | 67.4 | 47.1 | 66.9 |
| pH of Soln. | 9.5 | 9.6 | 12.5 | 9.5 | 9.5 |

*Polyox 301 PEO
**Viscosity determined at room temperature, Brookfield LVT viscometer, 60 rpm, #1 spindle.
***Suspensions used were the corresponding samples from Table I.

EXAMPLE VI

Solution time measurements of dry powdered poly(ethylene oxide), the standard commercial form of this polymer, were conducted and the results were compared against the solution times of fluidized polymer suspensions (FPS) of the poly(ethylene oxide) at equivalent polymer concentrations in water.

It was found in sets of tests addressing the dissolution behavior of these polymers that a fluidized polymer suspension of poly(ethylene oxide) unexpectedly produced consistently higher Brookfield viscosities in aqueous solutions as compared to the equivalent concentrations of dry polymer. The higher viscosities observed with the PEO FPS sample should be advantageous in the commercial use of this invention compared to existing dry powdered poly(ethylene oxide).

The results for the dissolution experiments for dry poly(ethylene oxide) and for the FPS form of this water soluble polymer are shown in Table VI. In the dry polymer experiments measured quantities of Polyox 301 PEO were added to measured amounts of dilution water in a 1 liter beaker to attain a given calculated concentration of polymer in a total solution mass of 500 grams. Upon first addition to the water, the PEO was stirred initially at a high shear rate of 2200 rpm for 1 minute to disperse the polymer and thereafter the stirring rate was adjusted to a constant rate of 1050 rpm. An anchor stirrer with a diameter of 1.75 inches was employed for the stirring. The position of the propeller was set in the center of the beaker at 1 inch height from the bottom. Periodically, the stirring was briefly interrupted at predetermined intervals and the Brookfield viscosities of the stirred solutions were measured before continuing their stirring.

It was observed in these experiments that the dry PEO at concentrations from 0.25%–0.75% in water exhibited its highest viscosity at the time of the 1 hour measurement, then as mixing continued, eventually the polymer solution viscosity decreased with time. The temperature of the Polyox 301 solutions remained fairly constant at about 25° C. during the course of the experiment. Unlike the lower concentration experiments at a concentration of 1% Polyox 301 in water, the viscosities of the solutions did not decrease after 16 hours of stirring but instead showed a slight increase. These results are shown in Table VI.

In the comparative experiment, Polyox 301 PEO was used to first prepare a 25% PEO by weight fluidized polymer suspension. This was formulated by dissolving 0.2 parts of xanthan gum in 54.7 parts by weight of water, then dissolving 20 parts of sodium formate n the water. After the sodium formate had dissolved, 25 parts of Polyox 301 PEO were added to the solution and stirred to disperse. Finally, 0.1 parts of Proxel GXL solution was added to the suspension as a preservative. The final product was a 25% PEO by weight fluid polymer suspension that was readily pourable.

The suspension of PEO was added to dilution water in the same manner as with dry Polyox 301 PEO above to attain the equivalent net Polyox 301 concentrations. The dissolution experiments with PEO FPS were conducted with the identical procedure as with the dry polymer. It was found in these tests that the PEO FPS developed much higher peak viscosity than the dry PEO at the same active polymer concentrations. These results are shown in Table VI. It was thus shown that the suspension form of PEO exhibited significant advantages in solution preparation over dry PEO, in terms of the solution viscosity attained at a given PEO concentration. This finding is useful in many applications where PEO is employed since it is the effect of the polymer to increase the viscosity of various systems that is often desired in these applications.

TABLE VI

Solution Viscosities of Powdered Polyox 301 PEO
and Polyox 301 PEO Suspension Versus
Concentration and Agitation Time
Polyox 301 PEO Concentration in Water

| Polymer Form + Stirring Time Dry PEO | 0.25% (cps) | 0.5% (cps) | 0.75% (cps) | 1.0% (cps) |
|---|---|---|---|---|
| 1st test 1 hour | 18 | 82 | 247 | 563 |
| 2nd test 1 hour | 19 | 73 | 243 | 620 |
| 1st test 2 hours | 10 | 73 | 226 | 573 |
| 2nd test 2 hours | 14 | 61 | 230 | 615 |
| 1st test 4 hours | 9 | 70 | 211 | 505 |
| 2nd test 4 hours | 12 | 53 | 185 | 548 |
| 1st test 8 hours | 9 | 63 | 198 | 508 |
| 2nd test 8 hours | 13 | 53 | 167 | 648 |
| 1st test 16 hours | 7 | 39 | 143 | 533 |
| 2nd test 16 hours | 10 | 27 | 153 | 695 |

| Polymer Form + Stirring Time PEO Suspension | 0.25% (cps) | 0.5% (cps) | 0.75% (cps) | 1.0% (cps) |
|---|---|---|---|---|
| 1st test 1 hour | 18 | 121 | 478 | 1153 |
| 2nd test 1 hour | 19 | 122 | 439 | 1033 |
| 1st test 2 hours | 17 | 109 | 444 | 1120 |
| 2nd test 2 hours | 16 | 101 | 427 | 1050 |
| 1st test 4 hours | 14 | 88 | 409 | 1070 |
| 2nd test 4 hours | 15 | 92 | 362 | 1050 |
| 1st test 8 hours | 14 | 90 | 387 | 1195 |
| 2nd test 8 hours | 16 | 87 | 330 | 1238 |

TABLE VI-continued

Solution Viscosities of Powdered Polyox 301 PEO
and Polyox 301 PEO Suspension Versus
Concentration and Agitation Time
Polyox 301 PEO Concentration in Water

| 1st test 16 hours | 10 | 39 | 268 | 1345 |
|---|---|---|---|---|
| 2nd test 16 hours | 12 | 50 | 256 | 1320 |

EXAMPLE VII

Five additional samples of FPS of PEO were tested for viscosity in the presence of 160 ppm ferric chloride.

The samples were:

| Sample | Stabilizing Salt |
|---|---|
| G | Sodium Acetate |
| H | Sodium Chloride |
| I | Sodium Hydroxide |
| J | Potassium Acetate |
| K | Potassium Citrate |

Solutions were made at 0.5% PEO solids in distilled water containing 160 ppm ferric chloride with the following results:

| Hours | G (cps) | H (cps) | I (cps) | J (cps) | K (cps) |
|---|---|---|---|---|---|
| Initial | 94.7 | 34.5 | 79.5 | 56.6 | 66.5 |
| 1 | 94.0 | 31.6 | 80.5 | 54.7 | 52.5 |
| 2.25 | 95.2 | 27.0 | 80.0 | 53.5 | 24.5 |
| 5 | 95.5 | 23.0 | 82.0 | 54.0 | 21.7 |
| 22 | 100.0 | 14.0 | 94.0 | 65.0 | 22.0 |
| 26.75 | 96.8 | 8.5 | 87.0 | 57.0 | 14.0 |

The solutions made in ferric chloride from samples G, H, I and J turned brown as soon as the PEO dispersion was added. Sample K remained a clear pale green. PEO from sample H never completely dissolved due to the presence of lumps of incompletely hydrated polymer; also, a brown precipitate formed when sample H was added to the ferric chloride solution. By 22 hours, samples G, I, and J also had a brown precipitate on the bottom of the container.

All viscosities were run at room temperature with a Brookfield LVT viscometer, #1 spindle, 60 rpm. Variations in room temperature probably accounted for some of the viscosity increases for certain measurements.

What is claimed:

1. A method for using an aqueous suspension of at least 15% of poly(ethylene oxide) as a flocculent in an aqueous slurry containing finely divided materials, comprising:

a) dispersing poly(ethylene oxide) in an aqueous solution of at least one salt selected from the group consisting of sodium formate, potassium formate, sodium hydroxide, potassium hydroxide, sodium citrate, potassium citrate, sodium acetate, potassium acetate, sodium chloride and mixtures thereof, to form a poly(ethylene oxide) suspension having at least 15% of poly(ethylene oxide) by total weight;

b) dissolving said dispersion in an aqueous system, and;

c) adding said dissolved aqueous system in conjunction with a solution of a coagulant or synthetic flocculents selected from the group consisting of alum, polyaluminum chloride, sodium aluminates, polyamines, polyacrylamides, copolymers of acrylamide with cationic or anionic monomers, and polyethylene imine, to the aqueous slurry containing finely divided materials; whereby said dissolved aqueous dispersion enhances the separation of the finely divided materials from the liquid in the aqueous slurry.

2. The method of claim 1 wherein agents that form association complexes with poly(ethane oxide) are added to the equeous system.

3. The method of claim 2 where the association complexing agent is phenol-formaldehyde resin.

4. The method of claim 2 where the association complexing agent is lignin.

5. The method of claim 1 where the aqueous system is the aqueous slurry so that the suspension is added as a direct additive to an aqueous system containing suspended solids.

* * * * *